United States Patent [19]
König

[11] Patent Number: 5,722,083
[45] Date of Patent: Feb. 24, 1998

[54] DIRECTING A SUBSCRIBER TOWARD A DESTINATION WITHIN AN SDMA MOBILE RADIO NETWORK

[75] Inventor: Wolfgang König, Ilsfeld, Germany

[73] Assignee: Alcatel N.V., Rijswijk, Netherlands

[21] Appl. No.: 671,539

[22] Filed: Jun. 27, 1996

[30] Foreign Application Priority Data

Jul. 8, 1995 [DE] Germany ............... 195 24 927.5

[51] Int. Cl.$^6$ ............... H04B 1/00; G01C 21/00
[52] U.S. Cl. ............... 455/517; 455/425; 340/990; 364/444.1; 364/449.3; 364/449.5
[58] Field of Search ............... 455/517, 4.2, 422, 455/425, 436, 437, 440, 445; 364/444.1, 444.2, 449.2, 449.3, 449.4, 449.9, 449.5; 340/990, 995

[56] References Cited

U.S. PATENT DOCUMENTS

| | | | |
|---|---|---|---|
| 4,954,958 | 9/1990 | Savage et al. | 364/436 |
| 5,187,810 | 2/1993 | Yoneyama et al. | 340/994 |
| 5,543,789 | 8/1996 | Behr et al. | 340/995 |
| 5,648,768 | 7/1997 | Bouve | 340/988 |

FOREIGN PATENT DOCUMENTS

| | | |
|---|---|---|
| 0367935 | 5/1990 | European Pat. Off. . |
| 0540387 | 5/1993 | European Pat. Off. . |
| 3816377 | 11/1989 | Germany . |
| 4240578 | 6/1994 | Germany . |
| 4340679 | 6/1995 | Germany . |
| 2243976 | 11/1991 | United Kingdom . |
| 9205672 | 4/1992 | WIPO . |
| 9312590 | 6/1993 | WIPO . |

OTHER PUBLICATIONS

"Die Elektronischen Beifahrer", *Funkschau*, May, 1988, pp. 46–48.

"CARIN, a Car Information and Navigation System", M. Thoone, *Philips Technical Review*, vol. 43, No. 11/12, Dec. 1987, pp. 317–329.

*Primary Examiner*—Donnie L. Crosland
*Attorney, Agent, or Firm*—Ware, Fressola, Van Der Sluys & Adolphson LLP

[57] ABSTRACT

A process for directing a subscriber toward a destination within an SDMA mobile radio network, and a processor-controlled facility (BSC) which operates accordingly are proposed. This facility contains a communications interface unit (IF1) for receiving a message that specifies a destination (DES) desired by a subscriber, and a microprocessor which determines the current location (LOC) of the subscriber by evaluating directional and distance information ($\alpha$, R). The processor-controlled facility (MSC) furthermore contains communications interface unit (IF2) whereby it retrieves information (INFO) from a data base (DB), which defines a route from the location (LOC) to the destination (DES). This information is transmitted in summary form to the subscriber's mobile radio terminal (MS).

9 Claims, 2 Drawing Sheets

DIRECTING A SUBSCRIBER TOWARD A DESTINATION WITHIN AN SDMA MOBILE RADIO NETWORK

TECHNICAL FIELD

The invention concerns a process for directing a subscriber toward a destination within an SDMA mobile radio network, and a processor-controlled facility for carrying out the process.

BACKGROUND OF THE INVENTION

An SDMA (Space Division Multiple Access) mobile radio network is known from WO 93/12590, whereby a base station exchanges messages simultaneously with several mobile radio terminals via a pair of radio frequencies. To that end, said base station contains a phase-controlled antenna array which, by means of a complex weighting of the transmitted and received signals, transmits or receives these directionally. This spatially separates the SDMA radio links between the base station and the mobile stations. From the complex weightings, a so-called "SDMA controller", which is integrated into the base station, calculates the different directions in space from which the mobile radio terminals are transmitting ("DOA: Direction of arrival"). In addition, the distances between the base station and the individual mobile radio terminals are determined by measuring the radio propagation time ("TOA: Time of arrival"). As described on page 22 of WO 93/12590, the "SDMA controller" calculates the spatial directions and distances, to determine the positions of the individual mobile radio terminals and in this way the locations of the subscribers. Accordingly, said base station with "SDMA controller" corresponds to a processor-controlled facility with computing means, which evaluates direction and distance information assigned to an SDMA radio link, to determine the current location of the respective subscriber.

DISCLOSURE OF INVENTION

It is the task of the invention to extend a processor-controlled facility of the above-cited type for carrying out such a process, so that it allows directing a subscriber toward a destination within an SDMA mobile radio network.

This task is fulfilled by a processor-controlled facility which performs a process for directing a subscriber toward a destination within a space-division multiple access mobile-radio network, the process comprising the steps of: transmitting from a mobile radio terminal of the subscriber to a base station of the space-division multiple access mobile-radio network a message specifying the destination; determining the subscriber's current location by evaluating directional and/or distance information assigned to a space-division multiple access radio link between the mobile radio terminal and at least the base station of the space division multiple access mobile-radio system; retrieving from a data base information data defining a route from the subscriber's current location to the destination; and transmitting the information data to the subscriber's mobile-radio terminal.

The invention proposes to equip the processor-controlled facility of the type cited above with a message transfer unit, which receives a message from the subscriber specifying a destination, and to equip it with a data transfer unit which retrieves information data stored in a data base that defines a route from the subscriber's location to this destination, and which is transmitted by the message transfer unit to the mobile radio terminal of the subscriber.

These measures of the invention offer a destination directing service to the subscribers of the SDMA mobile radio network, whereby a subscriber desiring directions is provided with information specifying a route to the desired destination. This destination directing service is of particular interest to a subscriber who finds himself in surroundings that are foreign to him, and who desires quick and comprehensive route information in a language he can understand. The invention uses the knowledge that the direction and distance information needed anyway for the establishment and maintenance of the SDMA radio link is also used for directing a subscriber. Either the direction and distance information that is available in one base station is used, or the direction and distance information that is available in at least two base stations is used.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
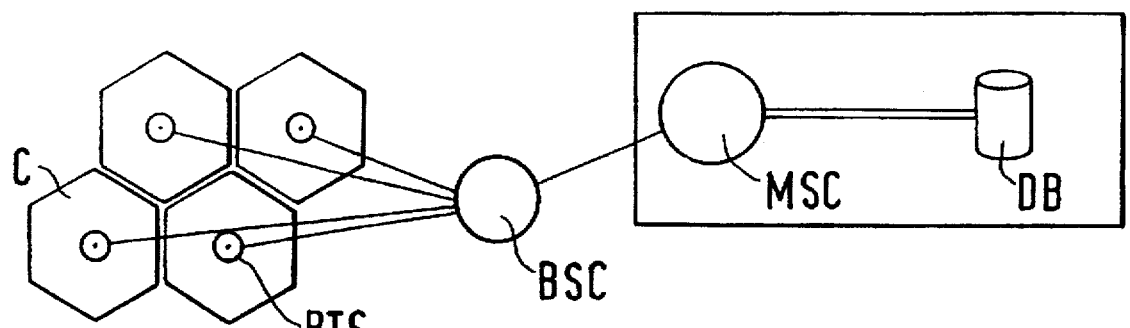
FIG. 1 schematically illustrates the construction of a mobile radio network equipped in accordance with the invention.

The schematically illustrated SDMA mobile radio network in FIG. 1 has several radio cells C, each of which is served by a base station BTS. The base stations are connected with a base station control BSC that controls the establishment of SDMA radio links between the base stations and the mobile radio terminals, which are located in the radio cells C. A mobile radio interface MSC, which connects the SDMA mobile radio network with a public telephone network and manages the subscriber data, connects the base station control BSC with a data base DB, in which the invention stores information data for directing a subscriber along a route that ends at a destination desired by the subscriber. In accordance with the invention, this mobile radio interface also forms a processor-controlled facility MSC for directing a subscriber who carries a mobile radio terminal.

Figure 2:
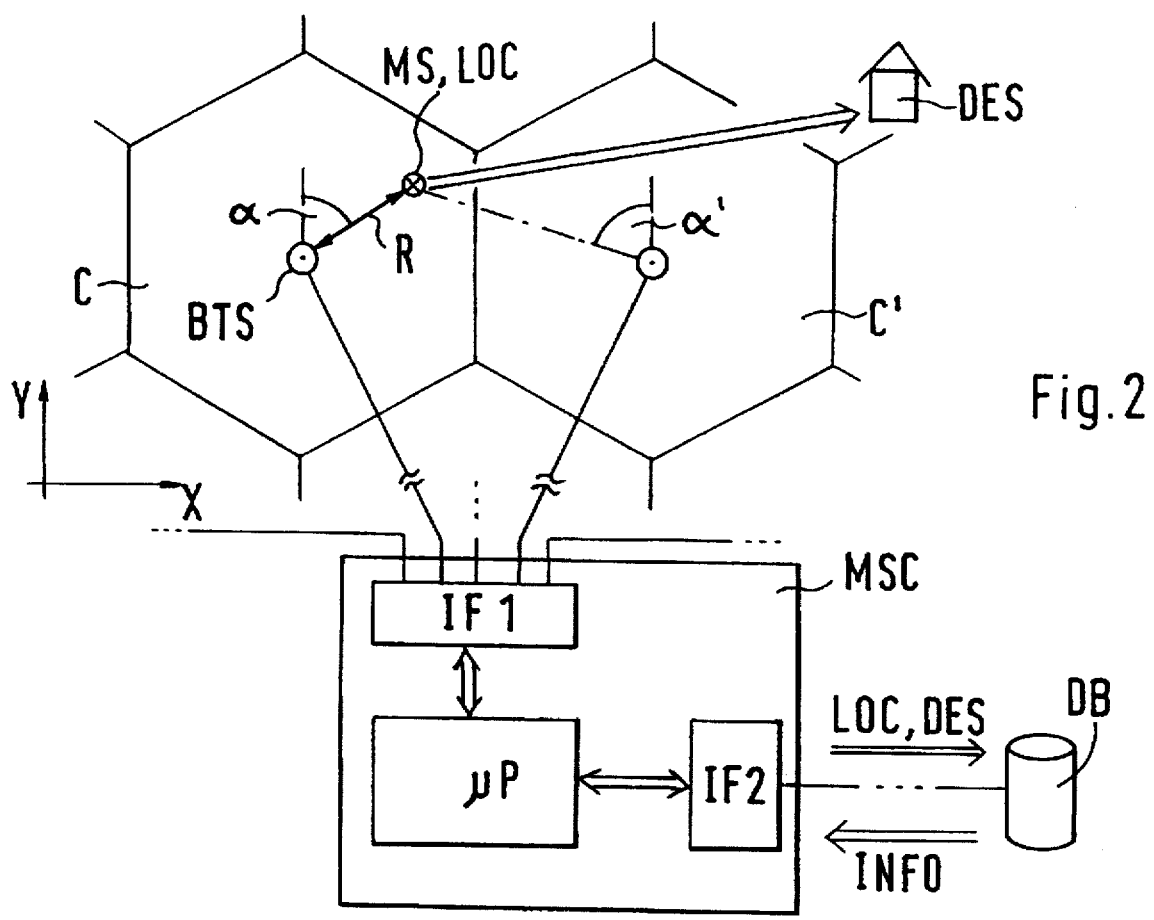
FIG. 2 illustrates the block circuit diagram of a processor-controlled facility according to the invention.

As illustrated schematically in FIG. 2, the processor-controlled facility MSC contains a computer means μP and a communications interface unit IF1 connected thereto, and a communications interface unit IF2 which is also connected thereto. The computer means used in this case may be a Pentium-type microprocessor (manufactured by Intel Corp.), for example. The communications interface units IF1 and IF2 are interface circuits for bidirectional signal transmission between the microprocessor μP and the base stations BTS or the data base DB.

Figure 3:
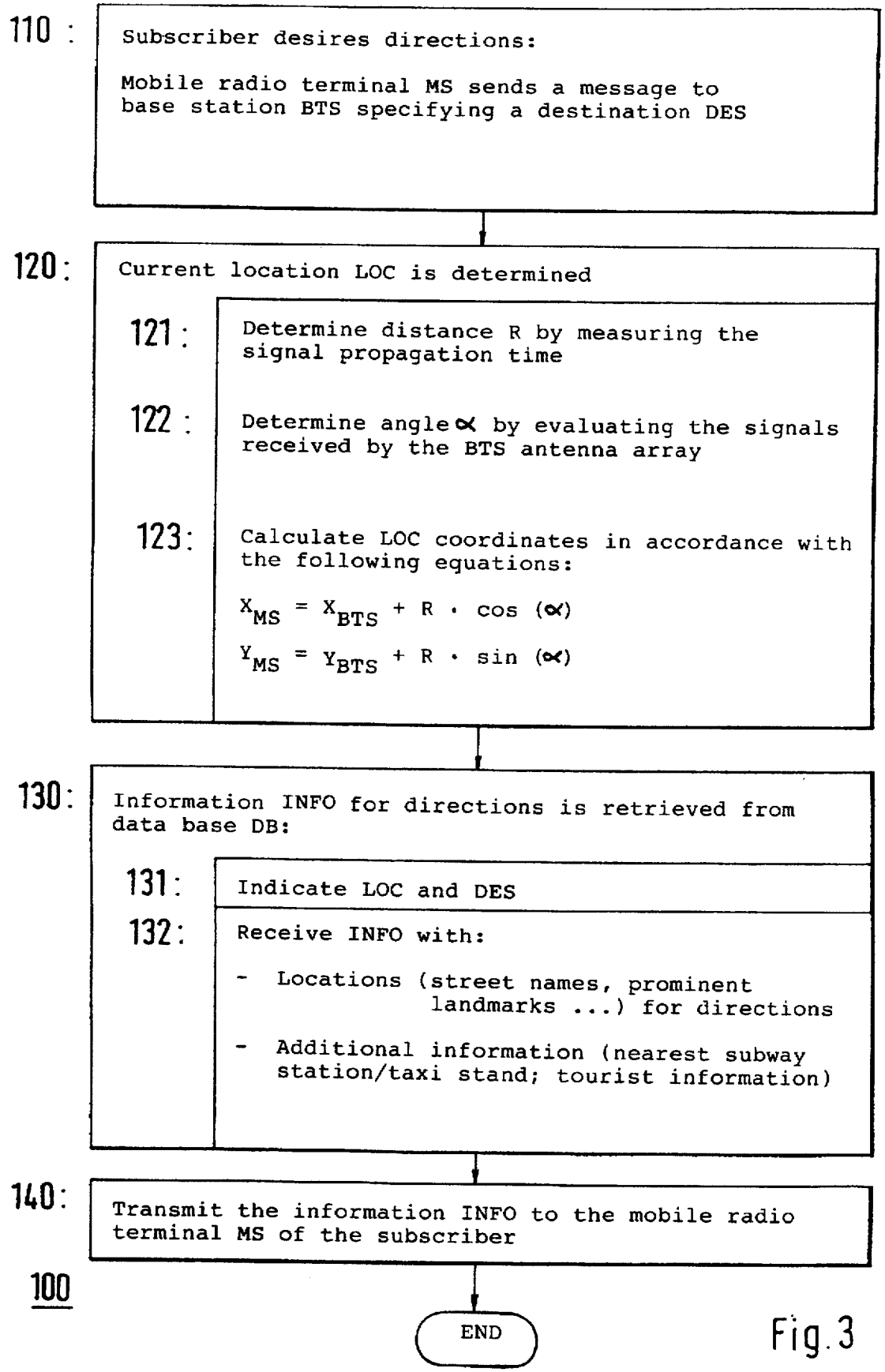
FIG. 3 schematically illustrates the flow chart of a process according to the invention.

To describe the invention further, reference is also made to the flow chart illustrated in FIG. 3. This example starts with a subscriber who only speaks his native language German and is traveling on business in Japan. He has just arrived by train at the main station in Osaka and is looking for a hotel with international standards and German-speaking service personnel, if possible. The subscriber, who desires to be directed toward a destination, first sends a message to the nearest base station BTS by means of his mobile radio terminal MS (step 110). By making the keyboard entry "0123-49" on his mobile radio terminal MS, the subscriber is connected to the local SDMA mobile radio network where he orders the destination directing service (identification signal "0123") in the German language (identification signal "-49").

The processor-controlled facility MSC then starts an interactive inquiry program, whereby messages are exchanged in summary protocol form between the mobile radio terminal MS and the communications interface unit IF1. The subscriber first receives a summarized message in German, containing the announcement "Welcome to the Osaka Destination Directing Service" and the request "Please Enter the Desired Destination". After the subscriber enters "Hotel" on the keyboard, the processor-controlled facility BSC answers with the request: "Please Select the Name/Category/Location of the Hotel". The subscriber then enters the letter "C", which is followed by the program request: "International or Japanese Category: 1=best standard/2=good standard/3=regular standard".

Entering the keyboard sequence "2, I" indicates the desired category. With the help of its communications interface unit IF1, the processor-controlled facility MSC now has all the parts of the message and thereby all the information regarding the destination DES.

In a step 120, the processor-controlled facility BSC now determines the subscriber's current location LOC. To that end, the radio signal propagation time is measured (partial step 121) to determine the distance R between the mobile radio terminal MS and the base station BTS. In this example, the measured radio signal propagation time is 24 ms, which corresponds to a distance R=2 km. In a partial step 122, the signals received by a phase-controlled antenna array, which is connected to the base station BTS, are evaluated. Evaluating the complex weights in accordance with the method described in WO 93/12590 determines an angle α, which indicates the direction of arrival of the radio signal transmitted to the mobile radio terminal MS. In this example α=45°, which in this instance corresponds to the "northeast" compass direction.

In a partial step 123, from the determined distance R, the angle α and the radio fix coordinates $X_{BTS}$ and $Y_{BTS}$ of the base station BTS, the microprocessor μP now calculates the Cartesian coordinates $X_{MS}$ and $Y_{MS}$, which indicate the current location LOC. The calculation is made in accordance with the following equations:

$$X_{MS}=X_{BTS}+R.\cos(\alpha)$$

$$Y_{MS}=Y_{BTS}+R.\sin(\alpha).$$

The processor-controlled facility MSC now has all the information of the location LOC and the destination DES, and stores these in a memory (not illustrated) which is connected to the microprocessor μP.

Due to continuous beam swiveling performed by the base station BTS or the base station control BSC, the above parameters R (distance) and α (angle) are already available, so that the partial steps 121 and 122 may be omitted. The determination of the location LOC performed by the processor-controlled facility MSC therefore consists essentially of partial step 123, whereby the coordinates of the current location LOC are determined.

In a step 130, the information INFO for giving the directions is retrieved from a data base DB, which is connected to communications interface unit IF2. In addition, communications interface unit IF2 sends the LOC and DES information to the data base DB (partial step 131), in accordance with a data transfer protocol.

The data base DB stores abundant information, such as locations, street names etc., which are needed to direct a subscriber toward a destination. This information is comparable to what can be found on a street map or a municipal plan. The data base DB furthermore stores additional information which describes local conditions at the location LOC, to facilitate the orientation of the subscriber. He is additionally informed of different possibilities regarding how he can quickly reach the desired destination. Based on the LOC and DES inputs, the data base DB provides information defining at least one route between the location LOC and the destination DES, and the above-described additional information if available. Together, these details form the data information INFO retrieved from data base DB.

In a step 140, by means of its communications interface unit IF1, the processor-controlled facility MSC transmits this information data INFO in the form of a summary to the mobile radio terminal MS. In this example, the summary contains the following message: "Route to>Palace Hotel<:

1.) Train station, north exit

2.) Go right on . . . street . . .

8.) Additional information: Subway line 7 to the hotel.

In the above example, only text data are transmitted in summary form. It can also be imagined to transmit video data, if the mobile radio terminal has a screen that is capable of displaying graphics. In this way sections of the municipal plan could be shown to the subscriber. In addition, written characters could be displayed in the language desired by the subscriber. It can further be imagined to display the locations, street names and descriptions such as "taxi" or "bus", etc. in both the original language and in the language desired by the subscriber. This would allow the subscriber to read these descriptions in the original language to better orient himself in the foreign surroundings.

It can also be imagined to convert the information data into voice data in the processor-controlled facility MSC. These are then transmitted by the communications interface unit as voice signals (synthetic speech) via a voice channel to the mobile radio terminal. In addition to the above-described process step 130, in which the distance and the angle referring to the one base station are determined to define the location of the subscriber, the following variations corresponding to a cross bearing can be imagined: on the one hand, the distances to different base stations which are adjacent to each other are determined. The intersection point of all the distance radii indicates the sought location. On the other hand, the angles of different base stations which are adjacent to each other are determined. The intersection point of all angles indicates the sought location. This type of cross bearing increases the accuracy of the process of determining the location.

The processor-controlled facility and the data base can also be integrated into one unit, thus forming a service central. To lighten the processor-controlled facility's load during the determination of the location, the processor capacity which already exists in the SDMA mobile radio system, such as e.g. the processors in the base station control or in a digital mobile radio interface, can be used. The invention is not limited to providing directions to persons. Other configuration examples whereby vehicles are guided automatically can be imagined. To that end, the information data retrieved from the data base are converted into control signals for steering the vehicle.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

I claim:

1. A process (100) for directing a subscriber toward a destination within an SDMA mobile-radio network, comprising the steps of:

(110): transmitting from a mobile radio terminal (MS) of the subscriber to a base station (BTS) of the SDMA mobile-radio network a message specifying the destination (DES);

(120): determining the subscriber's current location (LOC) by evaluating directional and/or distance information ($\alpha$, R) assigned to an SDMA radio link between the mobile radio terminal (MS) and at least said base station (BTS) of the SDMA mobile-radio system;

(130): retrieving from a data base (DB) information data (INFO) defining a route from the subscriber's current location (LOC) to the destination (DES); and (140): transmitting the information data (INFO) to the subscriber's mobile radio terminal (MS).

2. A process (100) as claimed in claim 1 wherein the step (120) for determining the subscriber's current location (LOC) comprises:

(121): determining a distance (R) between the mobile radio terminal (MS) and the base station (BTS) by measuring the radio signal propagation time; and (122): determining an angle ($\alpha$) indicating the direction of arrival of the radio signals from the mobile radio terminal (MS) by evaluating signals received by an antenna array connected to the base station (BTS).

3. A process (100) as claimed in claim 1 wherein the step (130) for retrieving the information (INFO) comprises:

(131): transmitting the subscriber's current location (LOC) and the destination (DES) to the data base (DB); and (132): generating the information (INFO) by combining data which is stored in the data base and which contains position information for directing the subscriber toward the destination as well as additional information about the surroundings of the subscriber's current location (LOC).

4. A process as claimed in claim 1 wherein the step for determining the subscriber's current location comprises:

determining, by a first measurement of the radio signal propagation time, a first distance radius representing the distance between the mobile radio terminal and the base station; and determining, by a second measurement of the radio signal propagation time, a second distance radius representing the distance to a base station adjacent to the base station.

5. A process as claimed in claim 1 wherein the step for determining the subscriber's current location comprises:

determining, by a first evaluation of signals received by an antenna array connected to the base station, a first angle which indicates a first direction of arrival of the radio signals transmitted by the mobile radio terminal; and determining, by a second evaluation of signals received by an antenna array connected to a base station adjacent to the base station, a second angle which indicates a second direction of arrival of the radio signals transmitted by the mobile radio terminal.

6. A processor-controlled facility (MSC) for directing a subscriber toward a destination within an SDMA mobile-radio network, comprising a computer means ($\mu$P) which is connected to at least one base station (BTS) of the mobile-radio network and which determines the subscriber's current location (LOC) by evaluating directional and/or distance information ($\alpha$, R) assigned to an SDMA radio link between the at least one base station (BTS) and a mobile radio terminal (MS) of the subscriber, characterized by a first communications interface unit (IF1) which provides the connection between the computer means ($\mu$P) and the at least one base station (BTS) and receives a message from the subscriber specifying a destination (DES), and by a second communications interface unit (IF2) which provides the connection between the computer means ($\mu$P) and a data base (DB) and retrieves information data (INFO) from the data base defining a route from the subscriber's current location (LOC) to the destination (DES), said information data (INFO) being transmitted from the first communications interface unit (IF1) to the mobile radio terminal (MS) of the subscriber.

7. A processor-controlled facility (MSC) as claimed in claim 6, characterized in that the first communications interface unit (IF1) converts the information data (INFO) to be transmitted to the mobile radio terminal (MS) into a short-message protocol.

8. A processor-controlled facility (MSC) as claimed in claim 6, characterized in that the first communications interface unit (IF1) comprises a voice synthesizer which converts the information data (INFO) into voice signals for transmission to the mobile radio terminal (MS).

9. A processor-controlled facility (MSC) as claimed in claim 6, characterized in that the second communications interface unit (IF2) retrieves from the data base (DB) additional information relating to public transportation whereby the subscriber can travel from his or her current location (LOC) to the destination (DES).

* * * * *